United States Patent
Conway

[11] Patent Number: 5,822,554
[45] Date of Patent: Oct. 13, 1998

[54] SYSTEM AND METHOD FOR IMPROVED MULTIPLEXING TO A DATA BUS

[75] Inventor: Craig M. Conway, Round Rock, Tex.

[73] Assignee: National Instruments Corporation, Austin, Tex.

[21] Appl. No.: 892,166

[22] Filed: Jul. 14, 1997

Related U.S. Application Data

[63] Continuation of Ser. No. 529,691, Sep. 18, 1995, abandoned.

[51] Int. Cl.$^6$ ........................................... G06F 13/38
[52] U.S. Cl. .................... 395/309; 395/310; 395/421.01; 395/307
[58] Field of Search ............................ 395/421.01, 306, 395/309, 316

[56] References Cited

U.S. PATENT DOCUMENTS

| | | | |
|---|---|---|---|
| 4,811,296 | 3/1989 | Garde | 365/189 |
| 4,852,083 | 7/1989 | Niehaus et al. | 370/58 |
| 4,963,767 | 10/1990 | Sinh | 307/455 |
| 5,355,035 | 10/1994 | Vora et al. | 307/494 |
| 5,543,731 | 8/1996 | Sigal et al. | 326/40 |

OTHER PUBLICATIONS

Mano, M. Morris, "Digital Design", Prentice–Hall Inc., NJ, pp. 166–167, 173–180, 258–264, 293–299, 1991.

*Primary Examiner*—Ayaz R. Sheikh
*Assistant Examiner*—Jigar Pancholi
*Attorney, Agent, or Firm*—Jeffrey C. Hood; Conley, Rose & Tayon

[57] ABSTRACT

A system and method for multiplexing the data outputs of multiple devices to a data bus using variable size multiplexers that do not require an even $2^N$ number of inputs. This enables logical groupings of like registers to be more easily and more efficiently multiplexed together. The multiplexing system includes a plurality of registers wherein each register supplies eight bits of data to an eight-bit data bus. Register decode logic receives addresses from the bus and outputs a plurality of register select signals that select the registers during write cycles. The register select signals are also coupled with the outputs of each respective register to form an internal 9-bit bus output from each of the registers. The 9-bit bus internal output from each of the plurality of registers are coupled through one or more layers of multiplexing logic to provide an output to the eight-bit data bus. Instead of using standard $2^N$ multiplexers with N select lines and $2^N$ inputs, the present invention uses multiplexers of any size not necessarily a multiple of 2. The multiplexers are preferably sized based on logical groupings of like registers. Therefore, the present invention uses multiplexers which can receive any number of X inputs, where X is not necessarily a multiple of two. This allows variable size multiplexers to be used in the system, thus reducing system components and simplifying the design process.

10 Claims, 2 Drawing Sheets

BANK1DATA = R1DATA if REG1 else
R2DATA if REG2 else
R3DATA if REG3 else
R4DATA if REG4 else
R5DATA if REG5 else BANK2DATA = R6 if REG6 else
R7 if REG7 else
R8 if REG8 else DOUT = BANK1DATA if B10(9) else
BANK2DATA

SYSTEM AND METHOD FOR IMPROVED MULTIPLEXING TO A DATA BUS

This application is a continuation of application Ser. No. 08/529,691, filed Sep. 18, 1995, now abandoned.

FIELD OF THE INVENTION

The present invention relates to multiplexing data signals to a data bus, and more particularly to coupling a plurality of data registers through multiplexing logic to a data bus wherein the mux selector control signals are coupled with the data signals output from each of the registers, thus allowing variable size multiplexing to the data bus.

DESCRIPTION OF THE RELATED ART

There have traditionally been three different ways for a plurality of devices to supply data to a common data bus. In one method, tri-state devices are coupled to the data bus wherein the devices can place the bus in either of three states, these being a high voltage state, i.e., +5 volts; a low voltage state, i.e., 0 volts; or a tri-state wherein no device is driving the bus and the bus is left floating. In addition to tri-state devices, open collector devices may be coupled to a data bus wherein, when no devices are driving the bus, the bus floats at a logic high value, and a device drives the bus low to place the bus in a logic low state. In a third method, each of the various devices which may place data on the data bus are connected through multiplexer logic, wherein the multiplexer logic selects the particular device that should drive data onto the bus.

As is well known, a multiplexer is a device which receives N controls signals and uses these N control signals to select between $2^N$ inputs to provide as an output. Examples of standard multiplexers include two input, four input, eight input, and sixteen input multiplexers having one, two, three and four select control lines, respectively. One problem with the use of multiplexers to provide data outputs to a data bus is that the multiplexer requires $2^N$ different inputs. This reduces flexibility and adds unnecessary cost to the system. Also, many times it is convenient and/or necessary to multiplex a plurality or grouping of like registers to a bus wherein the plurality or grouping does not comprise an even $2^N$ number of registers. Therefore, a system and method is desired which provides variable size multiplexing to a data bus.

SUMMARY OF THE INVENTION

The present invention comprises a system and method for multiplexing the data outputs of multiple devices to a data bus using variable size multiplexers that do not require an even $2^N$ number of inputs. This enables logical groupings of like registers to be more easily and more efficiently multiplexed together.

The preferred embodiment comprises an instrumentation system which includes a plurality of registers wherein each register supplies eight bits of data to an eight-bit data bus. Register decode logic receives addresses from the bus and outputs a plurality of register select signals that select the registers during write cycles. The register select signals are also coupled with the outputs of each respective register to form an internal 9-bit bus output from each of the registers. The 9-bit bus internal output from each of the plurality of registers are coupled through one or more layers of multiplexing logic to provide an output to the eight-bit data bus. Instead of using standard $2^N$ multiplexers with N select lines and $2^N$ inputs, the present invention uses multiplexers of any size not necessarily a power of 2. The multiplexers are preferably sized based on logical groupings of like registers. The eight bits of data and the corresponding select bit from each register are provided as inputs to the respective multiplexers. The select bit indicates whether the data from the respective register is the data that should be supplied out on the data bus.

Therefore, the present invention uses multiplexers which can receive any number of X inputs, where X is not necessarily a power of two. Each multiplexer includes X select lines provided as a bit associated with each eight-bit register that determines which register's data outputs are provided onto the data bus. This allows variable size multiplexers to be used in the system, thus reducing system components and simplifying the design process.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
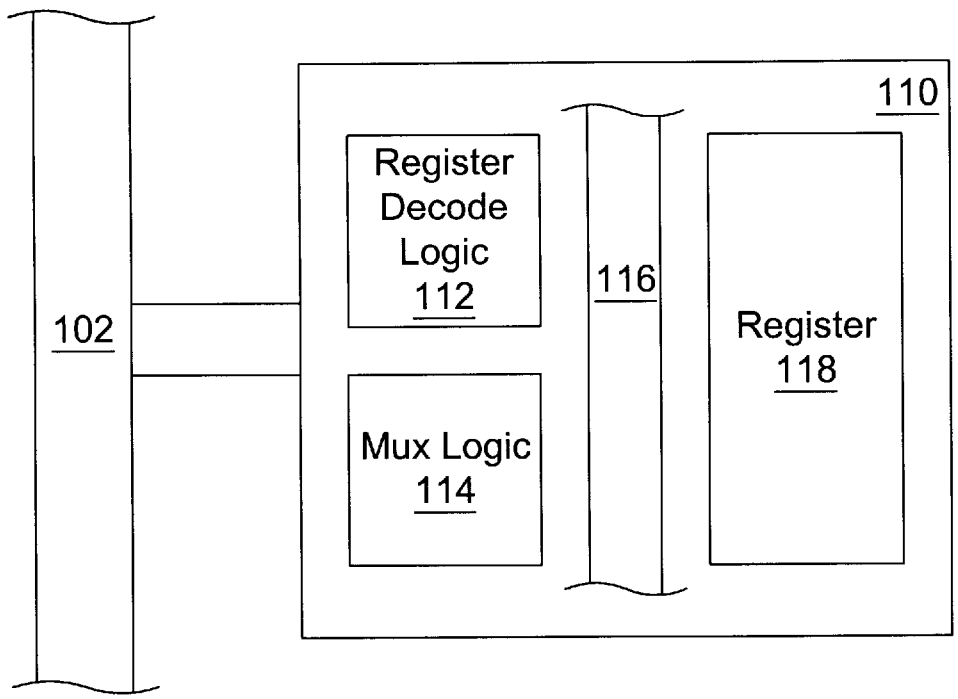
FIG. 1 illustrates a device coupled to a bus which includes variable-size multiplexers according to the preferred embodiment of the invention.

Referring now to FIG. 1, a device 110 including variable sized multiplexers according to the preferred embodiment of the invention is shown. In the present disclosure, register bit signals and data bus bit signals are designated with the numerals 1–8 or 1–9. As shown, the device 110 is coupled to a bus 102. The bus 102 preferably includes a plurality of data lines, a plurality of address lines and one or more control lines, including a read strobe signal and a write strobe signal. In the preferred embodiment, the bus 102 includes an eight bit data bus. However, it is noted that the bus 102 may comprise any number of data lines, as desired.

The device 110 includes variable sized multiplexers 114 according to the present invention. As shown, the device 110 includes a plurality of registers 118. The device 110 also includes register decode logic 112 which receives addresses from the bus 102 and provides decoded register select signals to the registers 118. The device 110 also includes the multiplexer (mux) logic 114 according to the present invention. As shown, the register decode logic 112 and the mux logic 114 interface to the registers 118 via an internal bus 116. In the preferred embodiment, the registers 118 are 8 bit registers, and the plurality of internal buses 116 are 9 bit buses each comprising 8 data bits and 1 register select bit for each respective register.

Figure 2:
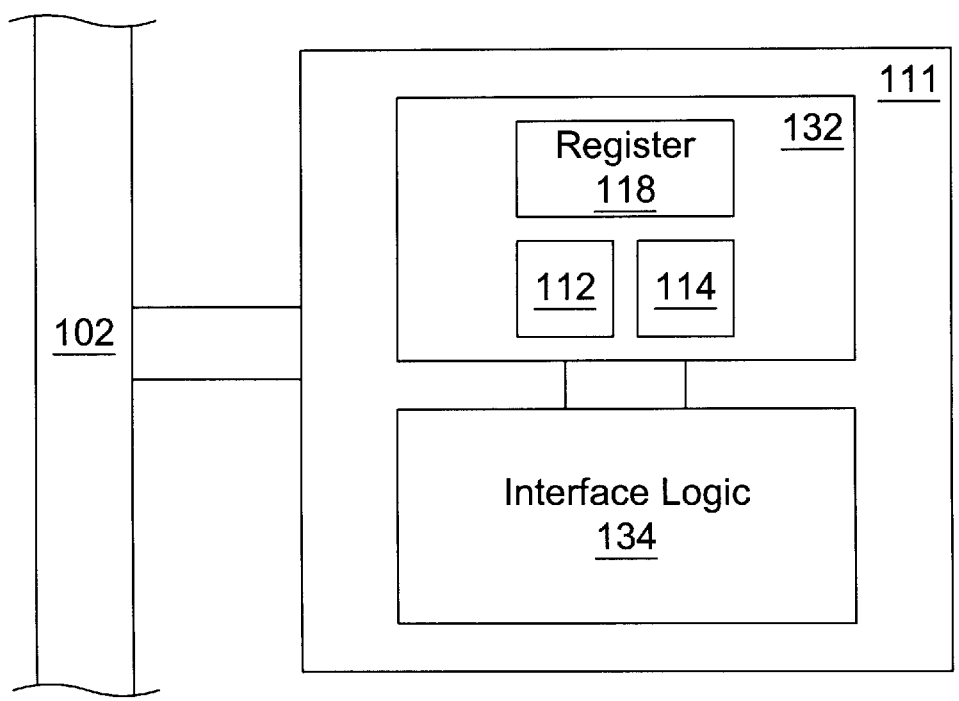
FIG. 2 illustrates an alternate embodiment of a device coupled to a bus which includes variable sized multiplexers according to the present invention.

Referring now to FIG. 2, an alternate embodiment of the device of FIG. 1 is shown. As shown in this embodiment, the device 111 includes an interface logic block or chip 134 which performs intelligent direct memory access (DMA) transfers and interfaces to one or more buses (not shown) in addition to the bus 102. The device 111 also includes a support chip 132 which performs various functions and includes the plurality of registers 118, as well as the register decode logic 112 and the mux logic 114 of the present invention as shown. In this embodiment, the mux logic 114 in the support chip 132 selects data signals that are output to the interface logic 134.

Figure 3:
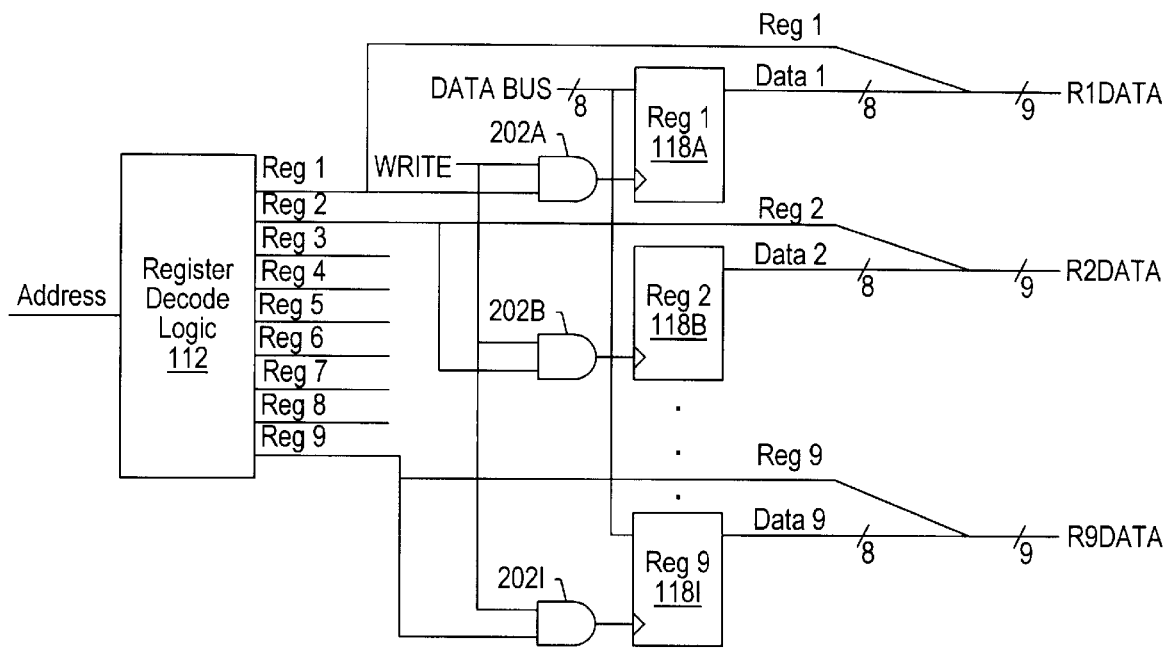
FIG. 3 illustrates the register decode logic and the plurality of registers in the device of FIGS. 1 or 2.

Referring now to FIG. 3, an embodiment illustrating the registers 118 and register decode logic 112 are shown. In the embodiment shown in FIG. 3, the register block 118 comprises nine registers, referred to as 118A–118I, and the register decoder 112 generates nine register select lines for each of the registers. It is noted that any number of registers may be used according to the present invention, and further that the registers may be of any size as desired.

As shown, the register decode logic 112 receives an address from the bus 102 and decodes this address for each of the registers 118. Each register 118 preferably includes a unique memory address space, and the register decode logic 112 decodes the address into a plurality of register select signals referred to as Reg1, Reg2, . . . Reg9 which decode the respective address space of its corresponding register. In the preferred embodiment, only one register select signal is asserted for each address.

As shown, each register select signal is provided as an input to a respective two-input AND gate 202A, 202B, . . . 202I. As shown, the Reg1 signal is provided as an input to the AND gate 202A, the Reg2 signal is provided as an input to the AND gate 202B, and so on, with the Reg9 signal being provided as an input to the AND gate 202I. The write strobe or write control signal from the bus 102 is provided as the second input to each of the AND gates 202A–202I.

The outputs from each of the AND gates 202A–202I are provided to the clock inputs of respective registers 118A, 118B, . . . 118I as shown. The 8 data bus signals comprised in the bus 102 are provided to eight data inputs of each of the registers 118A–I. Each of the registers 118A–I provides respective data outputs, referred to as DATA1, DATA2, . . . DATA9 as shown.

The respective register select signals Reg1–Reg9 for each register are also provided with or coupled to the corresponding data outputs DATA1–DATA9 of the registers 118A–I to form respective 9-bit data buses, referred to as R1DATA, R2DATA, . . . R9DATA as shown. In other words, the Reg1 signal is combined with the DATA1 signals to form a 9-bit bus, referred to as R1DATA, the Reg2 signal is combined with the DATA2 signals to form a 9-bit bus referred to as R2DATA, etc.

Figure 4:
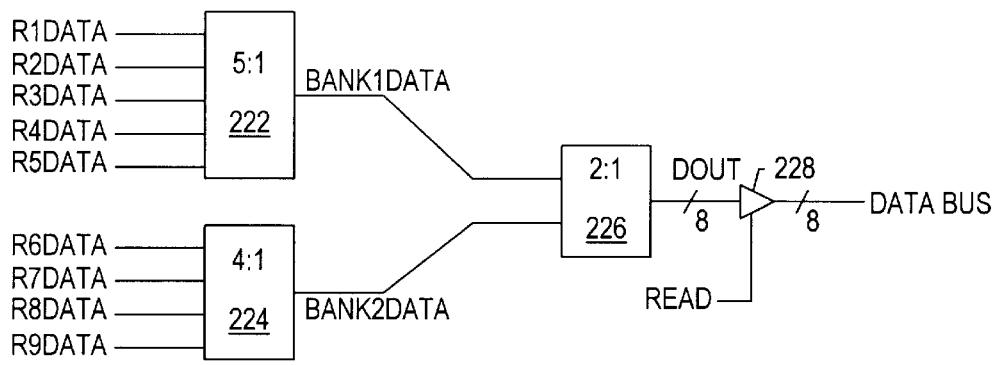
FIG. 4 illustrates variable sized multiplexers according to the present invention.

Referring now to FIG. 4, the multiplexer logic 114 according to one embodiment of the present invention is shown. In the embodiment shown, the multiplexer logic 114 includes a five-input multiplexer 222 and a four-input multiplexer 224. As shown, the five-input multiplexer 222 receives inputs R1DATA, R2DATA, R3DATA, R4DATA, and R5DATA. The four-input multiplexer 224 receives the inputs R6DATA, R7DATA, R8DATA and R9DATA. Each of the inputs to the multiplexers 222 and 224 comprise the internal 9-bit buses generated in FIG. 3, these buses including the 8 bits of data from a respective register and the corresponding register select bit that is joined with the 8 bits of data as shown in FIG. 3. Only one register select signal is asserted on each address decode, and thus only one of the R1DATA–R9DATA bus signals propagate as an output from the respective multiplexers 222 and 224.

The output of the multiplexer 222 comprises signals referred to as BANK1DATA, which are provided as an input to a two-input multiplexer 226. The output of the multi-plexer 224 are signals referred to as BANK2DATA which are provided as inputs to the two-input multiplexer 226. The output of the multiplexer 226 comprise signals referred to as DOUT. The DOUT signals comprise 8 data bits and no select bits. The DOUT signals are provided to an output buffer 228, which receives the read signal from the bus 102 as the enable signal for the buffer 228. Thus, on a read cycle, the register decode logic 112 decodes the address from the bus and asserts a respective register select signal, and this register select signal selects which of the data outputs are propagated through the multiplexers 222, 224, and 226 as outputs to the data bus.

The equation for the BANK1DATA signals output from the multiplexer 222 is:

| BANK1DATA = | R1DATA if R1DATA(9) else |
| | R2DATA if R2DATA(9) else |
| | R3DATA if R3DATA(9) else |
| | R4DATA if R4DATA(9) else |
| | R5DATA if R5DATA(9). |

The equation for the BANK2DATA signals output from the multiplexer 224 is as follows:

| BANK2DATA = | R6DATA if R6DATA(9) else |
| | R7DATA if R7DATA(9) else |
| | R8DATA if R8DATA(9). |

The equation for the DOUT signals output from the multi-plexer 226 is as follows:

| DOUT = | BANK1DATA if BANK1DATA(9) else |
| | BANK2DATA. |

Therefore, the respective asserted register select signal out from the register decode logic 112 determines which register's data is provided as an output to the data bus.

As shown, the present invention allows variable sized multiplexers that are not necessarily a power of 2. For example, FIG. 4 illustrates a five-input multiplexer and a four-input multiplexer. It is noted that multiplexers of any size can be used according to the present invention. For example, in the embodiment of FIG. 4, a 6-input multiplexer and a 3-input multiplexer may be used or three 3-input multiplexers may be used. In an embodiment including three 3-input multiplexers which replace the multiplexers 222 and 224, the multiplexer 226 is also a 3-input multiplexer. Alternatively, if the register 118 comprises 10 registers, then the multiplexers 222 and 224 may comprise two 5-input multiplexers, or a 7-input and 3-input multiplexer, or any other desired combination.

In the embodiment shown, the registers 118 are 8-bit regiters, and each multiplexer receives 9 bits at each of its inputs comprising 8 data bits and the respective register select bit. In an embodiment where the registers 118 are 16-bit registers, each multiplexer preferably receives 17 bits comprising 16 data signals and a respective register select signal. In an embodiment where the registers 118 are 32-bit registers, each multiplexer preferably receives 33 bits comprising 32 data signals and a respective register select signal. Thus, the multiplexers essentially receive a number of select signals equal to the number of inputs being multiplexed. This allows logical groupings of register outputs to be coupled to respective multiplexers wherein the groupings are not required to be a power of 2. For example, if it is deemed logically convenient to group nine like registers through multiplexing logic, the prior art methods would require a 16-input multiplexer for this purpose. However, the present invention can use a single 9-input multiplexer, or a 5-input and 4-input multiplexer, or any other combination as desired to perform the necessary multiplexing.

The following two pages comprise VHDL code which illustrate an example of one embodiment of the invention:

```
-- Local Interrupt Module Register Decode Logic
-- CMC
library synth;
use synth.stdsynth.all;
use work.muxpk.all;
entity LIRQREADREG is
    port (
                ICMDRRD : in vlbit_1d(8 downto 0);      -- Interrupt Command
                IPLCRRD : in vlbit_1d(8 downto 0);      -- IPL Configuration
                LICRU7RD : in vlbit_1d(8 downto 0);     -- LIRQ Configuration Upper
                LICRU6RD : in vlbit_1d(8 downto 0);
                LICRU5RD : in vlbit_1d(8 downto 0);
                LICRU4RD : in vlbit_1d(8 downto 0);
                LICRU3RD : in vlbit_1d(8 downto 0);
                LICRU2RD : in vlbit_1d(8 downto 0);
                LICRU1RD : in vlbit_1d(8 downto 0);
                LICRL7RD : in vlbit_1d(8 downto 0);     -- LIRQ Configuration Lower
                LICRL6RD : in vlbit_1d(8 downto 0);
                LICRL5RD : in vlbit_1d(8 downto 0);
                LICRL4RD : in vlbit_1d(8 downto 0);
                LICRL3RD : in vlbit_1d(8 downto 0);
                LICRL2RD : in vlbit_1d(8 downto 0);
                LICRL1RD : in vlbit_1d(8 downto 0);
                LIRQENRRD : in vlbit_1d(8 downto 0);    -- LIRQ Enable
                IG1ICRRD : in vlbit_1d(8 downto 0);     -- Int Grp 1 Config
                IG1ISRRD : in vlbit_1d(8 downto 0);     -- Int Grp 1 Status
                IG2RD : in vlbit_1d(8 downto 0);        -- Interrupt Group 2
                BICRRD : in vlbit_1d(8 downto 0);       -- Bad IACK Configuration
                VDRVRRD : in vlbit_1d(8 downto 0);      -- VIRQ Drive
                VSRRD : in vlbit_1d(8 downto 0);        -- VXI Status
                OURVSRRD : in vlbit_1d(8 downto 0);     -- Our VIRQ
                ILSRRD : in vlbit_1d(8 downto 0);       -- Internal LIRQ Stat
                IISRRD : in vlbit_1d(8 downto 0);       -- Internal IRQ Stat
                ISRRD : in vlbit_1d(8 downto 0);        -- Interrupt Source
                DIRRD : in vlbit_1d(8 downto 0);        -- Drive Interrupt
                MIRLRD : in vlbit_1d(8 downto 0);       -- MXI Interrupt
                ILR0RD : in vlbit_1d(8 downto 0);       -- Interrupt Level Router 0
                ILR1RD : in vlbit_1d(8 downto 0);       -- Interrupt Level Router 1
                VICRRD : in vlbit_1d(8 downto 0);       -- VXI Int Ctrl Reg
                -- outputs
                LIRQDOUT : out vlbit_1d(8 downto 0)     -- LIRQ Data Out
    );
end LIRQREADREG;
architecture RTL of LIRQREADREG is
    signal RDA, RDB, RDC, RDD : vlbit_1d(8 downto 0);
begin
    RDA <=      LICRU7RD when LICRU7RD(8)='1' else
                LICRU6RD when LICRU6RD(8)='1' else
                LICRU5RD when LICRU5RD(8)='1' else
                LICRU4RD when LICRU4RD(8)='1' else
                LICRU3RD when LICRU3RD(8)='1' else
                LICRU2RD when LICRU2RD(8)='1' else
                LICRU1RD when LICRU1RD(8)='1' else
                IG1ICRRD;
    RDB <=      LICRL7RD when LICRL7RD(8)='1' else
                LICRL6RD when LICRL6RD(8)='1' else
                LICRL5RD when LICRL5RD(8)='1' else
                LICRL4RD when LICRL4RD(8)='1' else
                LICRL3RD when LICRL3RD(8)='1' else
                LICRL2RD when LICRL2RD(8)='1' else
                LICRL1RD when LICRL1RD(8)='1' else
                IG1ISRRD;
    RDC <=      ICMDRRD when ICMDRRD(8)='1' else
                IPLCRRD when IPLCRRD(8)='1' else
                IG2RD when IG2RD(8)='1' else
                VDRVRRD when VDRVRRD(8)='1' else
                ILSRRD when ILSRRD(8)='1' else
                IISRRD when IISRRD(8)='1' else
                VSRRD when VSRRD(8)='1' else
                OURVSRRD;
    RDD <=      BICRRD when BICRRD(8)='1' else
                LIRQENRRD when LIRQENRRD(8)='1' else
                ISRRD when ISRRD(8)='1' else
                DIRRD when DIRRD(8)='1' else
```

```
                MIRLRD when MIRLRD(8)='1' else
                ILR0RD when ILR0RD(8)='1' else
                ILR1RD when ILR1RD(8)='1' else
                VICRRD;
    LIRQDOUT <=  RDA when RDA(8)='1' else
                 RDB when RDB(8)='1' else
                 RDC when RDC(8)='1' else
                 RDD;
end RTL;
```

CONCLUSION

Therefore, a system which provides variable sized multiplexers which are not necessarily a power of 2 is shown and described. Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A multiplexing system for presenting data onto a data bus using variable sized multiplexers, comprising:

a bus comprising a plurality x of data lines, a plurality of address lines, and control signals including a read signal and a write signal;

a plurality N of registers each including x data inputs coupled to said x data lines of said bus and each including x outputs for presenting stored data;

a register address decoder coupled to said address lines of said bus which receives an address from said bus, decodes said address and generates a plurality N of register select signals corresponding to said plurality N of registers;

a plurality N of x+1 bit buses coupled to said plurality N of registers, wherein each of said x+1 bit buses comprise x data signals output from said x outputs of a respective one of said registers and one of said register select signals corresponding to said respective one of said registers;

a first layer of one or more multiplexers coupled to said plurality N of registers which each receive different ones of said plurality N of x+1 bit buses;

wherein each multiplexer outputs a selected x+1 bit bus determined by the register select signals it receives.

2. The multiplexing system of claim 1, wherein said register address decoder asserts only one of said plurality N of register select signals for each address decoded by said register address decoder.

3. The multiplexing system of claim 1, wherein the number of x+1 bit buses received by at least one of said one or more multiplexers is not a power of 2.

4. The multiplexing system of claim 1, further comprising a second layer of one or more multiplexers;

wherein each multiplexer in said second layer receives the selected x+1 bit bus from at least two different ones of the multiplexers in said first layer, and wherein each multiplexer in said second layer outputs x data bits from one of the selected x+1 bit buses it received as determined by the register select signals it receives.

5. The multiplexing system of claim 1, wherein said one or more multiplexers include a five-input multiplexer.

6. The multiplexing system of claim 1, wherein said one or more multiplexers include a three-input multiplexer.

7. A multiplexing system, comprising:

a first level of a plurality of multiplexers, each first level multiplexer adapted to receive a plurality of inputs, wherein each input includes at least one data signal and a select signal, each first level multiplexer further adapted to provide a first level output, wherein the at least one data signal and the select signal from a particular one of said inputs are provided on said first level output, wherein the particular one of said inputs is determined by the select signals from each input; and a second level of at least one multiplexer, each said at least one multiplexer adapted to receive the outputs from at least two of said first level multiplexers, each second level multiplexer further adapted to provide a second level output, wherein the at least one data signal from a particular one of first level outputs is provided on said second level output, wherein the particular one of said first level outputs is determined by the select signals from each first level output.

8. The multiplexing system of claim 7, further comprising a address decoder adapted to decode an address and generate the select signals received by said first level multiplexers, wherein the address decoder asserts one of the select signals for a given address.

9. The multiplexing system of claim 8, further comprising a plurality of registers, each register adapted to provide one of the at least one data bits received with each said input of said first level multiplexers, wherein each select signals corresponds to one of said plurality of registers.

10. The multiplexing system of claim 7, wherein the number of the inputs received by at least one of the first level multiplexers is not a power of two.

* * * * *